US011346747B2

(12) United States Patent
Merle et al.

(10) Patent No.: US 11,346,747 B2
(45) Date of Patent: May 31, 2022

(54) QTIP—QUANTITATIVE TEST INTERFEROMETRIC PLATE

(71) Applicant: HARRIS CORPORATION, Melbourne, FL (US)

(72) Inventors: Cormic Merle, Rochester, NY (US); Daniel Balonek, Bergen, NY (US); Gene Olczak, Pittsford, NY (US); Malcolm O'Sullivan, Pittsford, NY (US)

(73) Assignee: Harris Corporation, Melbourne, FL (US)

( * ) Notice: Subject to any disclaimer, the term of this patent is extended or adjusted under 35 U.S.C. 154(b) by 45 days.

(21) Appl. No.: 15/795,802

(22) Filed: Oct. 27, 2017

(65) Prior Publication Data

US 2019/0128774 A1    May 2, 2019

(51) Int. Cl.
*G01M 11/02* (2006.01)

(52) U.S. Cl.
CPC .... *G01M 11/0271* (2013.01); *G01M 11/0207* (2013.01)

(58) Field of Classification Search
CPC .......... G01M 11/0271; G01M 11/0207; G01B 11/2441; G01B 9/02038; G01B 9/02039
See application file for complete search history.

(56) References Cited

U.S. PATENT DOCUMENTS

| | | | | |
|---|---|---|---|---|
| 2,591,666 A * | 4/1952 | Barkas | ..................... | G01B 9/02 356/505 |
| 4,072,423 A * | 2/1978 | Kimura | ..................... | G01B 9/02 356/497 |
| 4,732,483 A * | 3/1988 | Biegen | ............... | G01B 11/2441 356/495 |
| 4,872,755 A * | 10/1989 | Kuchel | ..................... | G01J 9/02 356/495 |
| 5,257,088 A * | 10/1993 | Tyson, II | ............. | G01B 11/161 244/125 |
| 6,069,700 A * | 5/2000 | Rudnick | ............... | G01B 11/002 356/496 |
| 7,050,175 B1 * | 5/2006 | Freimann | ........... | G01B 11/2441 356/512 |
| 2003/0048457 A1 * | 3/2003 | Evans | ..................... | H05K 1/024 356/513 |
| 2005/0068540 A1 * | 3/2005 | De Groot | ............ | G03F 7/70775 356/512 |
| 2009/0213386 A1 * | 8/2009 | LeBlanc | ............. | G01B 11/2441 356/495 |
| 2011/0007323 A1 * | 1/2011 | De Groot | ........... | G01B 9/02057 356/519 |
| 2016/0069820 A1 * | 3/2016 | Bueno | ..................... | G01S 17/89 356/607 |

* cited by examiner

*Primary Examiner* — Hwa Andrew Lee
(74) *Attorney, Agent, or Firm* — RatnerPrestia (57) ABSTRACT

A system for testing an optical surface, the system comprising a non-coherent light source, a detector, a test plate positioned between the non-coherent light source and the optical surface, the test plate separated from the optical surface by a gap, and a processor. The processer is configured to cause the non-coherent light source to illuminate the test plate and optical surface with non-coherent light, control the detector to capture an interferogram produced by interference between light reflected from the test plate and light reflected from the optical surface, and perform quantitative analysis on the interferogram to characterize aberrations in the optical surface.

26 Claims, 9 Drawing Sheets

QTIP—QUANTITATIVE TEST INTERFEROMETRIC PLATE

FIELD

The present invention relates to a system and method for testing optical surfaces, such as those found in reflective and diffractive optical components, by performing a quantitative test with an interferometric plate.

BACKGROUND

During manufacturing, optical surfaces are polished to remove aberrations (e.g. imperfections) from the optic surface that could cause distortions in a captured image. A large telescope, such as the Large Synoptic Survey Telescope (LSST), typically includes large convex lenses and/or mirrors. For example, the LSST features a unique three-mirror, three-lens optical assembly, including a 8.4 meter primary mirror and a 3.2 meter secondary mirror (M2), designed to create an exceptionally wide field of view with the ability to survey the large portions of the sky. Testing such optical surfaces for aberrations is not trivial and typically relies on interferometry techniques. One known interferometry-based technique to test for imperfections utilizes a test plate. The test plate is moved across a component optical surface, and a technician visually inspects fringes of an interferogram produced by light impinging on the test plate. Such a qualitative test, however, is limited to the accuracy of the human eye and experience of the technician. A second known interferometry-based technique to test for imperfections replaces the technician with a computer that analyzes the fringes of the interferogram. This technique utilizes a coherent light source (e.g. laser) and additional laser optics to illuminate the test plate. A camera then captures and analyzes the interferogram using tilt carrier techniques. Such a quantitative test, however, is complex and expensive because additional optics are required to maintain a consistently strict alignment between the laser and the test plate.

SUMMARY

A system for testing an optical surface, the system comprising a non-coherent light source, a detector, a test plate positioned between the non-coherent light source and the optical surface, the test plate separated from the optical surface by a gap, and a processor. The processer is configured to cause the non-coherent light source to illuminate the test plate and optical surface with non-coherent light, control the detector to capture an interferogram produced by interference between light reflected from the test plate and light reflected from the optical surface, and perform quantitative analysis on the interferogram to characterize aberrations in the optical surface.

A method for testing an optical surface having a non-coherent light source, a detector, a test plate, and a processor. The method comprising the steps of positioning the test plate in a first position between the non-coherent light source and the optical surface such that there is a gap between the optical surface and the test plate, controlling, by the processor, the non-coherent light source to illuminate the test plate and optical surface with non-coherent light, controlling, by the processor, the detector to capture an interferogram produced by interference between light reflected from the test plate and light reflected from the optical surface, and performing, by the processor, quantitative analysis on the interferogram to characterize aberrations in the optical surface.

DETAILED DESCRIPTION

Aspects of the present invention provide a system and method for testing optical surfaces such as those found on mirrors and lenses. The method/system implements a Quantitative Test using an Interferometric test Plate (QTIP), and exemplary embodiments will herein be referred to as the "QTIP system, "QTIP process," "QTIP analysis," "QTIP testing," and the like. Although ideal for identifying mid-spatial errors, such as errors in frequencies from 10 mm to 100 mm, to an accuracy of <0.02 wav RMS, use of this method is not limited to any particular frequency range. Similarly, although found particularly useful for use in connection with an optical surface having a convex aspheric prescription, the method and system are not limited to optical surfaces having any particular characteristics.

Figure 1A:
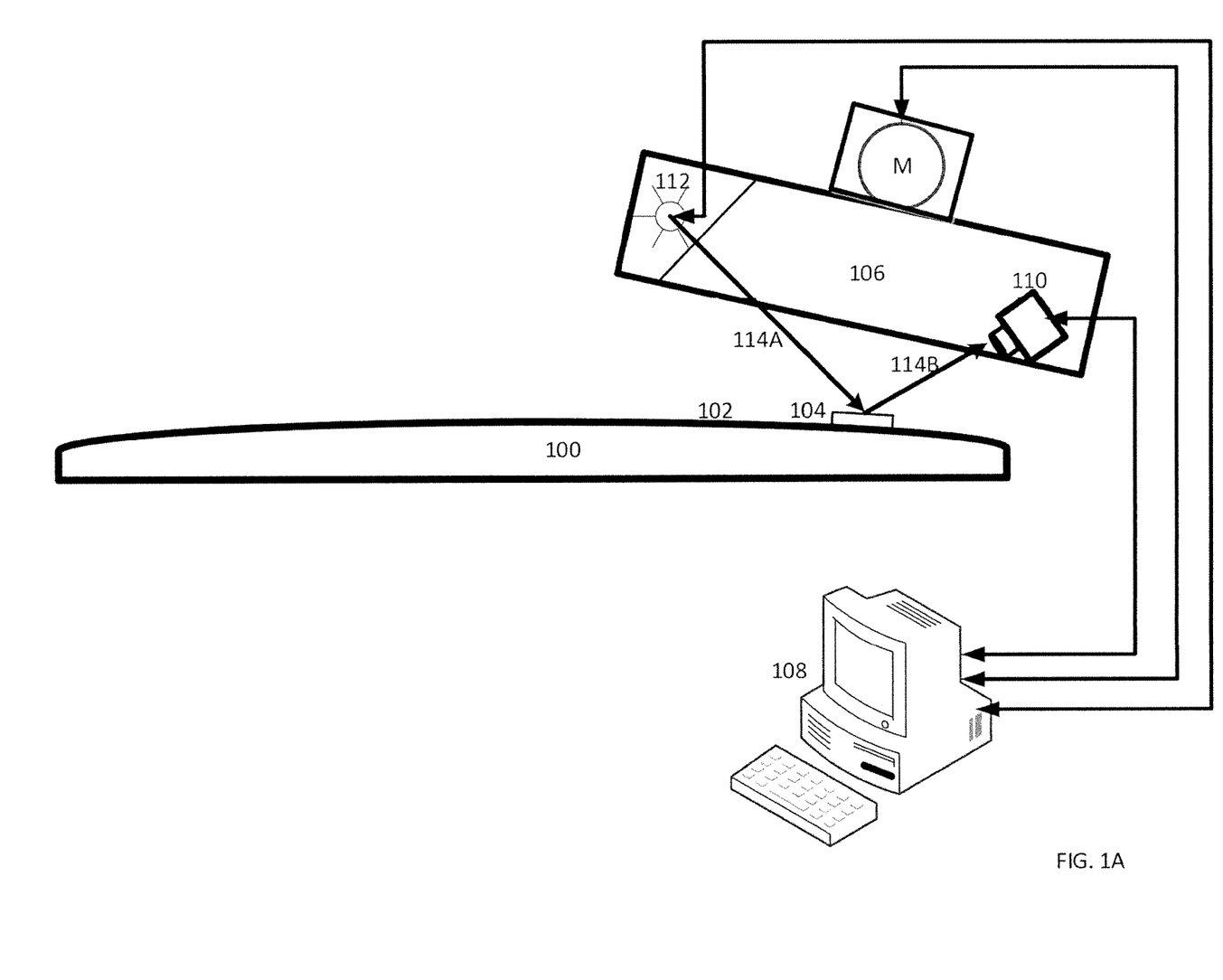
FIG. 1A is a side view of an exemplary system for testing quality of an optical surface, according to an embodiment of the present invention.

FIG. 1A shows a side view of an exemplary QTIP system for testing the quality of an optical surface 102 of an optical component 100 under test. The exemplary QTIP system includes a test plate 104 and a light box 106 controlled by a computer 108 (e.g. personal computer (PC), computer server, or the like, having a computer processor and memory containing specially programmed instructions for causing the processor to perform the method steps described herein). Light box 106 includes a non-coherent light source 112 (e.g. incandescent bulb, gas discharge bulb, LED, etc.) and a detector 110. The detector may be a detector array configured to capture an image, such as a charge-coupled device (CCD), a digital camera, etc.) operable in the wavelength range emitted by the light source. Also included is an optional electric motor M mounted to the light box.

As understood to those of skill in the art, the term "non-coherent" light source specifically excludes spatially coherent sources such as direct laser light sources but may include spatially incoherent narrow bandwidth sources e.g., gas discharge lamps, incandescent lamps, light emitting diodes, etc. that have smaller temporal-coherence than laser light sources. The light source may emit light (and image capture device may capture images) in a spectrum comprising any wavelength range, including light in a wavelength range visible to the human eye and not visible to the human eye, such as infrared wavelengths. The image capture device may comprise any type of device known in the art for capturing digital images and suitable for capturing digital images for further processing in accordance with the invention. The image capture device may use any type of image capture technology, including but not limited to a Charge Coupled Device (CCD) or a Complementary Metal-Oxide Semiconductor (CMOS) chip. The term "camera" or "digital camera" is used herein as shorthand to refer to any type of image capture device.

In order to test the surface quality of optical surface 102, test plate 104 is positioned (e.g. either manually by a technician or automatically by computer 108) over a selected area of optical surface 102. Light box 106 is then positioned with respect to (e.g. suspended above) optical surface 102, so that test plate 104 is illuminated by non-coherent light source 112 while in the field of view of detector 110. Non-coherent light source 112 pay be controlled by Computer 108. The light emitted from non-coherent light source 112 impinges on test plate 104 and optical surface under test 102 (e.g. light beam 114A). Light reflected from test plate 104 and light reflected from optical surface 102 (e.g. light beam 114B) create an interferogram that is captured as an image by detector 110. Fringes in this interferogram image are then analyzed quantitatively by computer 108 which implements tilt carrier analysis to quantify aberrations in optical surface 102. Details of tilt carrier analysis are known in the art, such as Malacara, Daniel, Valentin I. Vlad, and Manuel Servin "Spatial carrier analysis of interferograms with aspheric wavefronts." Proc. SPIE. Vol. 2340. No. 1. 1994, incorporated by reference herein.

Figure 1B:
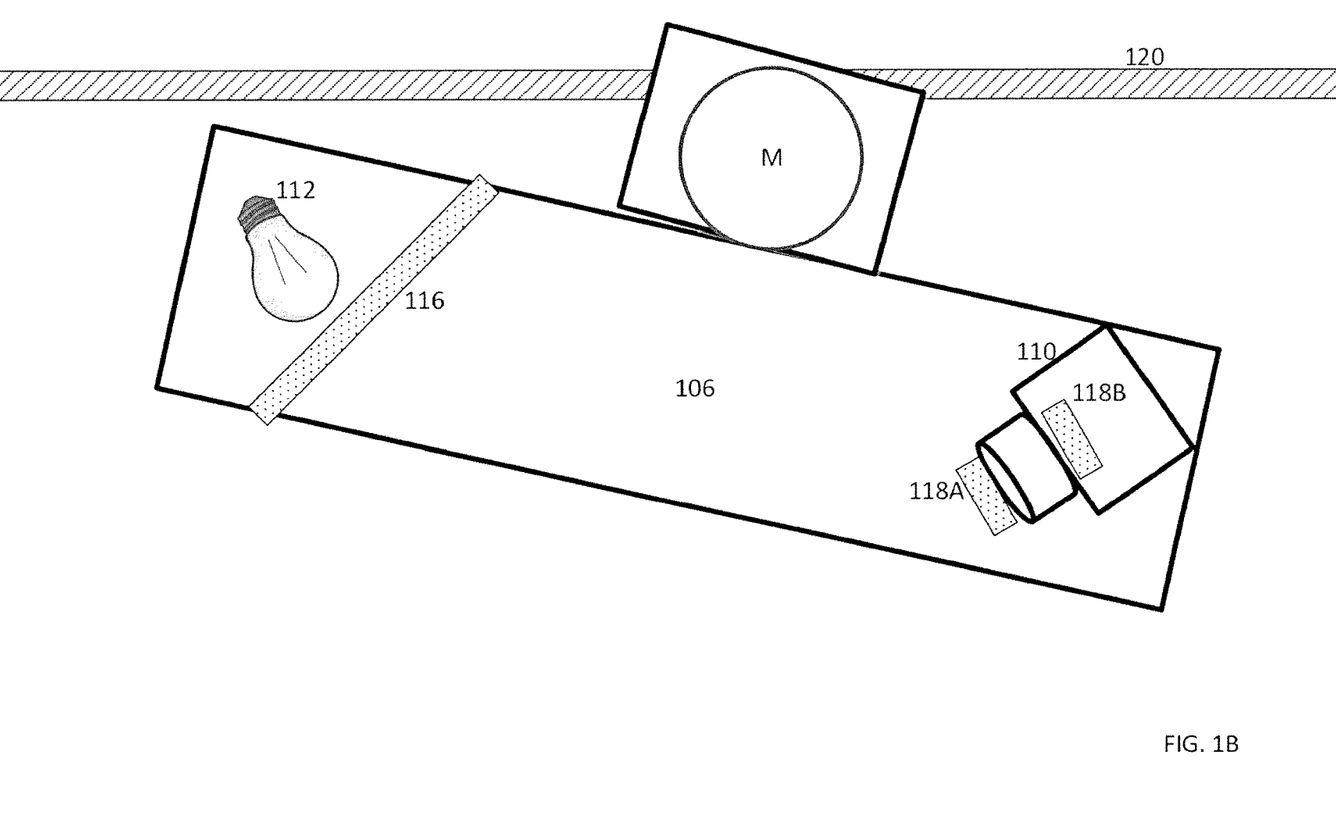
FIG. 1B is a close-up side view of the light box in the exemplary system of FIG. 1A, according to an embodiment of the present invention.

FIG. 1B shows further details of light box 106 from FIG. 1A. Specifically, FIG. 1B shows that light box 106 may include an optional diffuser 116 positioned in front of non-coherent light source 112. Diffuser 116 may be utilized to ensure that the non-coherent light source 112 evenly illuminates test plate 104. An optical filter may also be included in light box 106 to select a particular wavelength of light for use in tilt carrier analysis. This optical filter may be mounted as filter 118A positioned in front of the main lens of detector 110. Alternatively the optical filter may be mounted as filter 118B positioned at another location within the internal camera optics. Generally, the optical filter can be placed anywhere in the optical chain to filter received light before the imager captures the image. This filter may be, for example, a narrow bandpass filter configured to pass a single wavelength of light, while rejecting other wavelengths.

Although not necessary, light box 106 may include a positioner for disposing the light box relative to the optical surface, wherein the positioner is configured to move the light box from one testing location. An exemplary positioner may comprise a motor M and a gear box (not shown) connecting light box 106 to a track or gantry system 120 suspended (e.g. from the ceiling) above optical surface 102. This configuration allows computer 108 to control motor M to move light box 106 in 2-dimensional or 3-dimensional space so that light box 106 can be positioned at a height and/or oriented above a predetermined section of optical surface 102. The height may be determined based on the characteristics of the optical surface 102 under test, the test plate 104, the light box 106, and other factors. Optionally, positioner 120 may comprise a crane (not shown) or a wire suspension system, or any other structural configuration that permits light box to be positioned in 2-dimensional or 3-dimensional space above the optical surface. For example, light box 106 may be mounted to a boom of a crane and positioned at the selected test location either manually by a technician or automatically by the computer. Any equivalent method or system will suffice, as long as light box 106 can be positioned at an equivalent height above an equivalent selected section of optical surface 102, as expressed by coordinates relative to a reference point, and can be moved from a first imaging location to a second imaging location.

FIGS. 1A and 1B show an exemplary embodiment in which the non-coherent light source and camera are mounted in the same light box. This is not necessary. For example, the non-coherent light source and the camera can be mounted on different fixtures, because the use of non-coherent light minimizes adverse effects traditionally caused by relative movement between the light source, camera and test plate.

Figure 2:
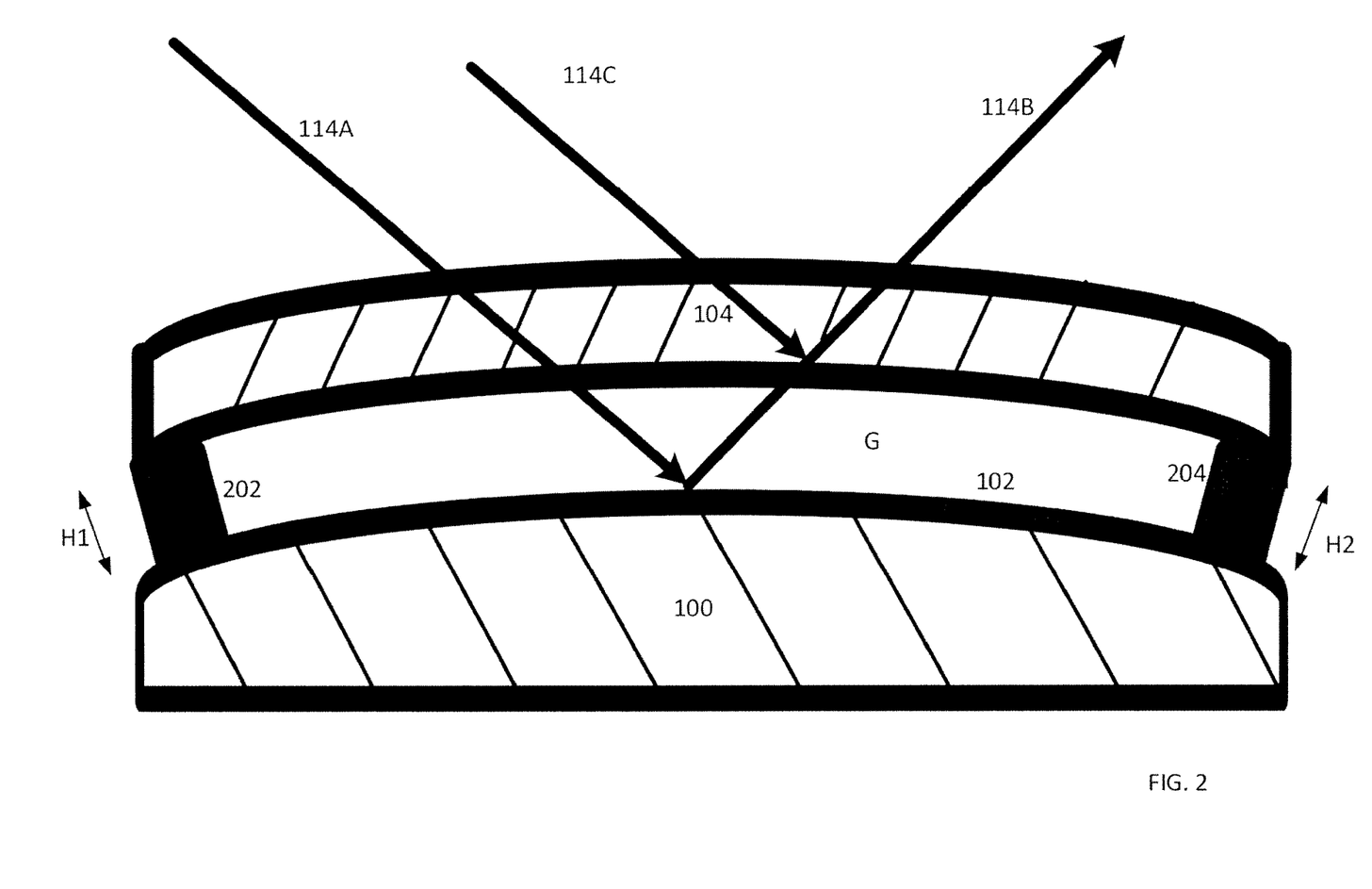
FIG. 2 is close-up side view of the optical surface being tested relative to the test plate, according to an embodiment of the present invention.

Another component of the exemplary QTIP system is test plate 104, which is smaller in diameter relative to the optical surface under test. For example, for the LSST M2, having a diameter of 3.4 meters, a 6" test plate may be used, which is less than approximately $\frac{1}{20}$ the diameter of the optical surface under test. FIG. 2 shows further details of test plate 104 relative to optical surface 102. Generally, test plate 104 is positioned on a selected area (area under test) of optical surface 102. Test plate 104 is spaced, using shims 202/204, at heights H1 and H2 above optical surface 102. These heights H1 and H2 may be determined based on various factors including but not limited to the type of test plate, the type of optical surface under test, etc. Typically, when performing tilt carrier analysis, H1 and H2 are set by shims 202 and 204 respectively to position test plate 104 on an incline relative to optical surface 102 (e.g. H1 is greater than H2 or vice versa). The difference in H1 and H2 may be in the order of microns to produce an orientation of test plate 104 that produces optical fringes when irradiated with light. In general, as the incline (tilt) of test plate 104 increases, the number of optical fringes increase. Therefore, a desirable number of fringes may be selected by adjusting the tilt accordingly. The spacing due to H1 and H2 produces an air gap G that is spatially varying between the bottom surface of test plate 104 and the optical surface 102. This gap G provides a medium for light to travel between test plate 104 and the optical surface 102.

Test plate 104 may have a spherical optical configuration, which lends itself to conventional polish and low midspatial errors. Test plate 104 may also have a best fit sphere to optic prescription. However, it is noted that test plate 104 is not limited to any particular configuration.

During testing, light from non-coherent light source 112 impinges on test plate 104 (e.g. light beams 114A and 114C). Light beam 114A may transmit at least partially through test plate 104 and become reflected as light beam 114B (e.g. test beam) by the optical surface 102. Light beam 114C may become at least partially reflected (e.g. reference beam) by the surface of test plate 104 and travel along the same path as reflection 114B. The light reflected from test plate 104 and the light reflected from optical surface 102 (e.g. test beam and reference beam) overlap and interfere with each other which produces an interferogram that is captured by detector 110. It should be noted that only two light beams are shown for illustration purposes. However, during the actual test, the entire surface of test plate 104, as well as at least the portion of the optical surface 102 underlying the test plate, would be illuminated, creating an interferogram with multiple fringes.

Shims 202/204 as shown in FIG. 2 may be static hinges (e.g. plastic spacers) having fixed dimensions for producing a predetermined gap G. Alternatively, shims 202/204 may be dynamic hinges (e.g. equipped with piezoelectric actuators) that allow height H (and therefore gap G) to be adjusted before, after or during testing of optical surface 102. These dynamic hinges may be controlled by computer 108. Any equivalent device for producing gap G may suffice. In general tilt carrier techniques employ a spatial variation in gap G (i.e. wedge). It will be recognized by one skilled in the art that temporal phasing shifting over multiple measurements of surface 102 may be accomplished by controlling the piezoelectric actuators, manual adjustment of the shims, wavelength shifting of the light source or other well-known techniques. This phase shifting technique could be employed to support the quantitative analysis.

Generally, shims 202/204 may be located at any point along the perimeter of test plate 104 to provide the desired spatial relationship between the test plate and the optical surface under test. In addition, shims 202/204 may have different heights with respect to each other, thereby providing the ability to orient test plate 104 at different incidence angles with respect to light box 106. For example, test plate 104 may be tilted at a specific angle with respect to the bottom, top, left, right, etc. of the camera reference frame. This may be beneficial to produce an accurate interferogram.

Figure 3:
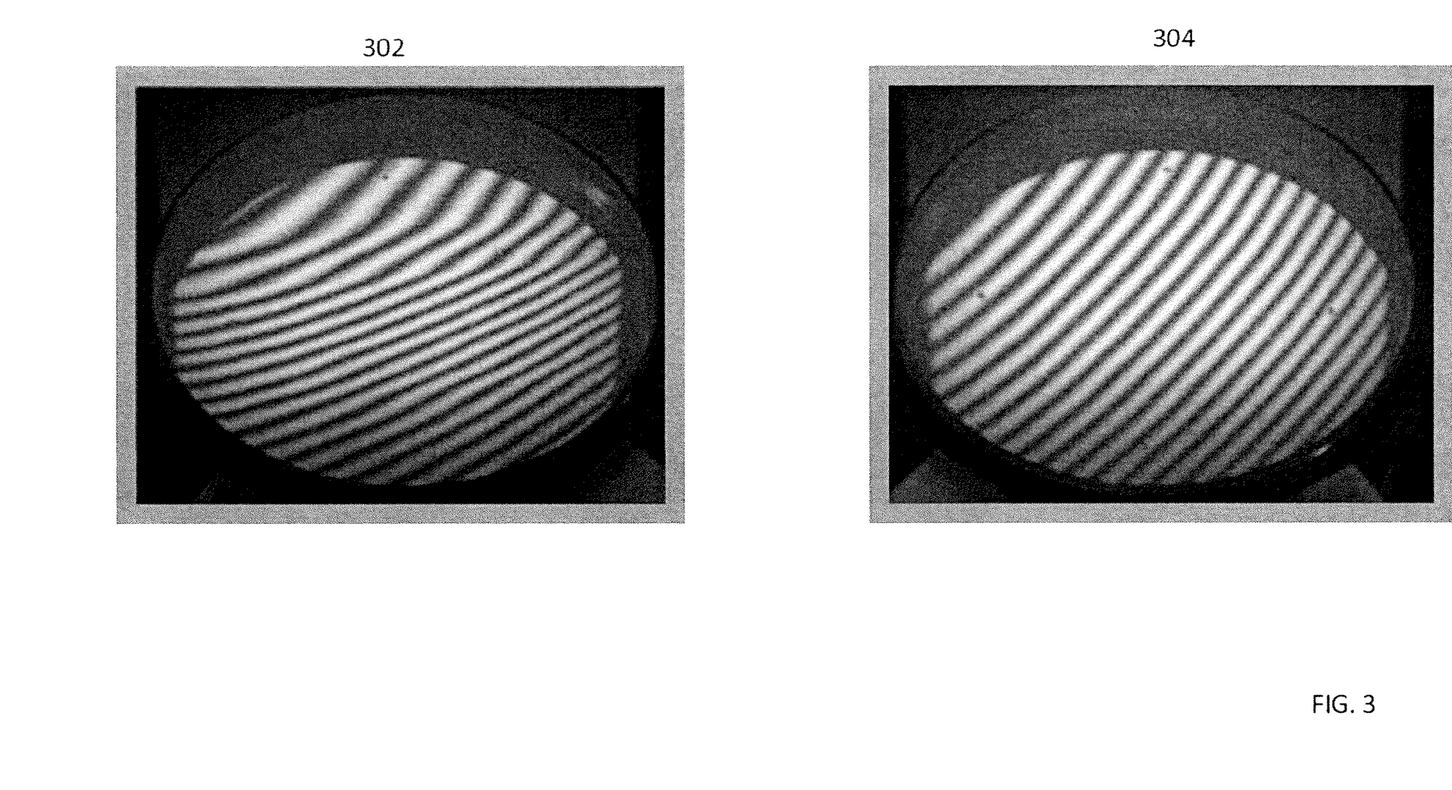
FIG. 3 is a visual rendering of interferogram fringes captured by the exemplary system, according to an embodiment of the present invention.

Examples of interferograms produced and captured by the exemplary QTIP system are shown in FIG. 3. Interferogram 302 shows multiple fringes that appear to be wavy. These wavy fringes indicate to the technician that the section of optical surface 102 that is being tested by the test plate needs further polishing. In contrast, interferogram 304 shows multiple fringes that appear to be straight. This would appear to indicate that the section of optical surface 102 does not need further polishing. However, aberrations indistinguishable to the human eye may still be present on the surface of optical surface 102. In this scenario, tilt carrier analysis is performed to determine if the optical surface 102 needs further polishing.

Figure 4:
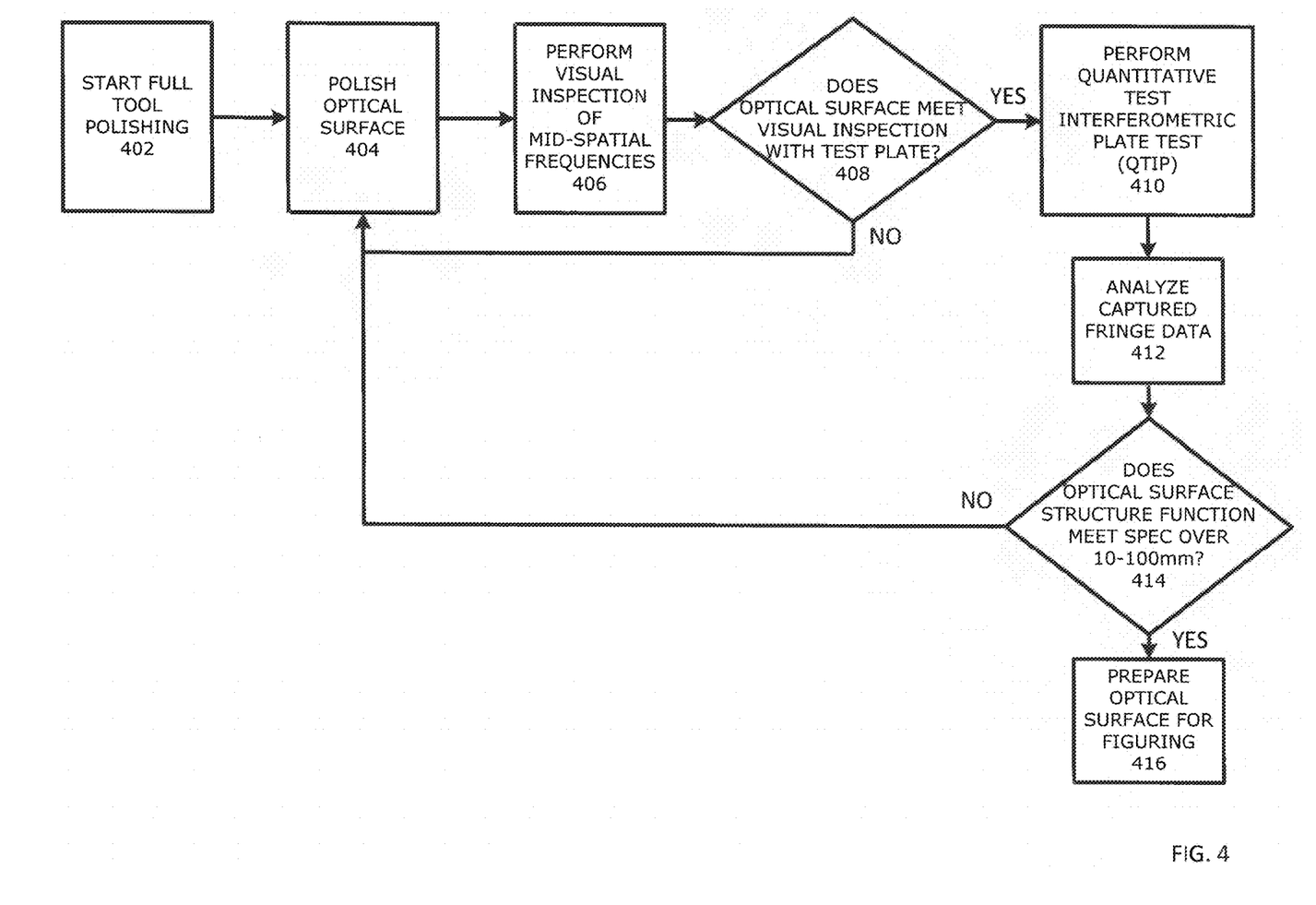
FIG. 4 is flowchart of a process flow according to an embodiment of the present invention implemented for polishing an optical surface.

FIG. 4 shows an example of the QTIP process flow for determining aberrations in optical surface 102. In steps 402/404, optical surface 102 is polished. In this example, optical surface under test 102 is a large convex optical surface (e.g. mirror). After a first polishing step is finished, at step 406, a technician places test plate 104 on a selected section of optical surface 102 and illuminates test plate 104 using light box 106. The interferogram image captured by the camera is then viewed on a computer screen by a technician. If the interferogram does not meet the visual inspection (e.g. has wavy fringes visible to the human eye, as in interferogram 302), then a second polishing step is performed in step 404. If, however, the interferogram does meet the visual inspection (e.g. appears to have straight fringes to the human eye, as in interferogram 304), then the process advances to step 410 for detection of mid-spatial errors.

As described above, during the exemplary QTIP process, light box 106 illuminates the test plate 104, and detector 110 captures the image of the interferogram. The fringes of this interferogram are then analyzed quantitatively by computer 108 in step 412 using a fringe analysis technique such as tilt carrier analysis. Generally, tilt carrier analysis analyzes the fringes to determine aberrations in optical surface 102. Once the tilt carrier analysis is complete, a human operator or computer 108 makes a determination in step 414 as to whether the portion of the optical surface 102 under testing passes or fails. If the portion under test passes, then that portion does not require further polishing and is considered prepared for figuring in step 416. However, if optical surface 102 fails, further polishing is performed in step 404 and the testing process steps are repeated.

Figure 5A:
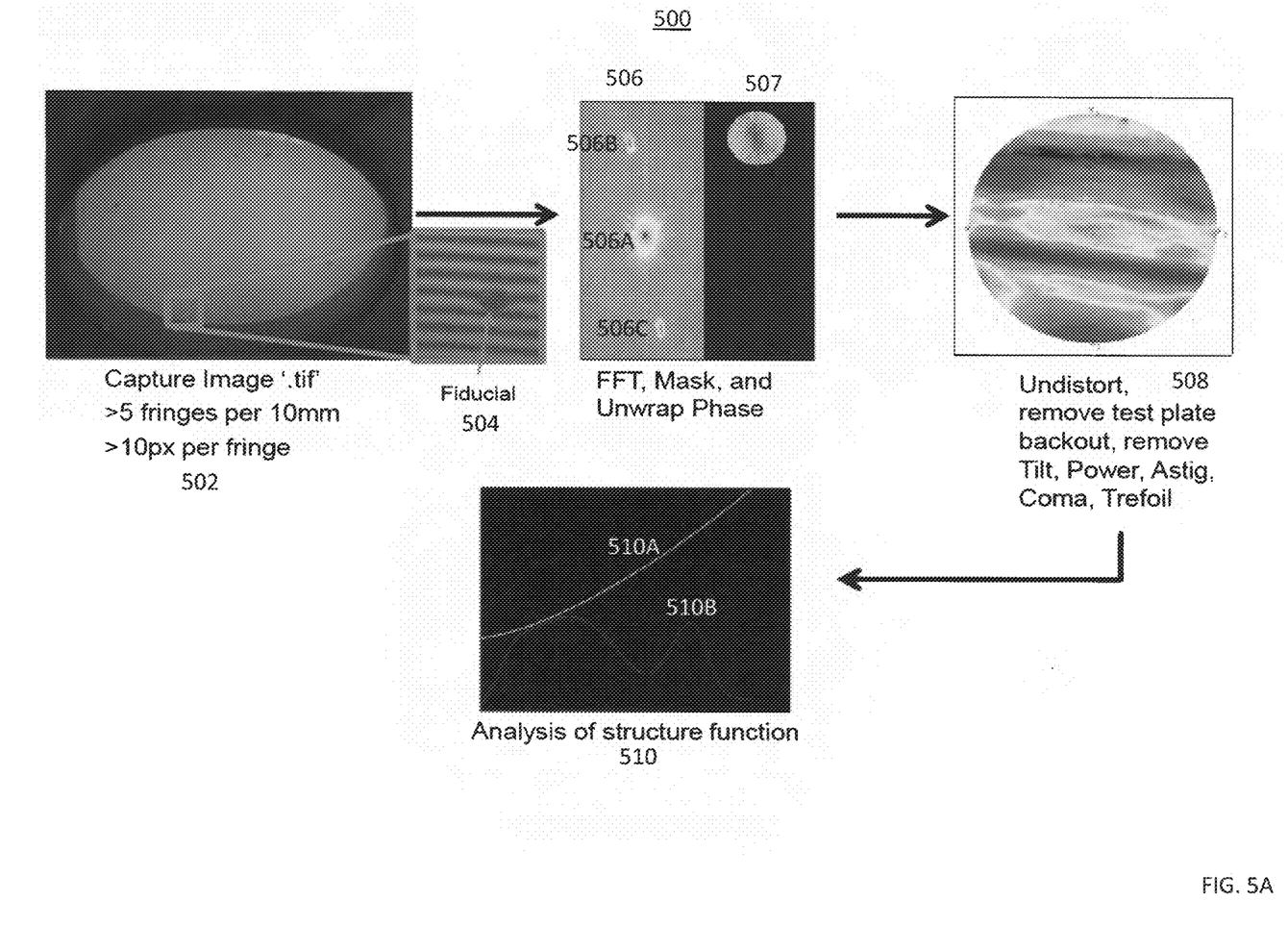
FIG. 5A is a visual rendering of a process flow for testing the optical surface, according to an embodiment of the present invention.
Figure 5B:
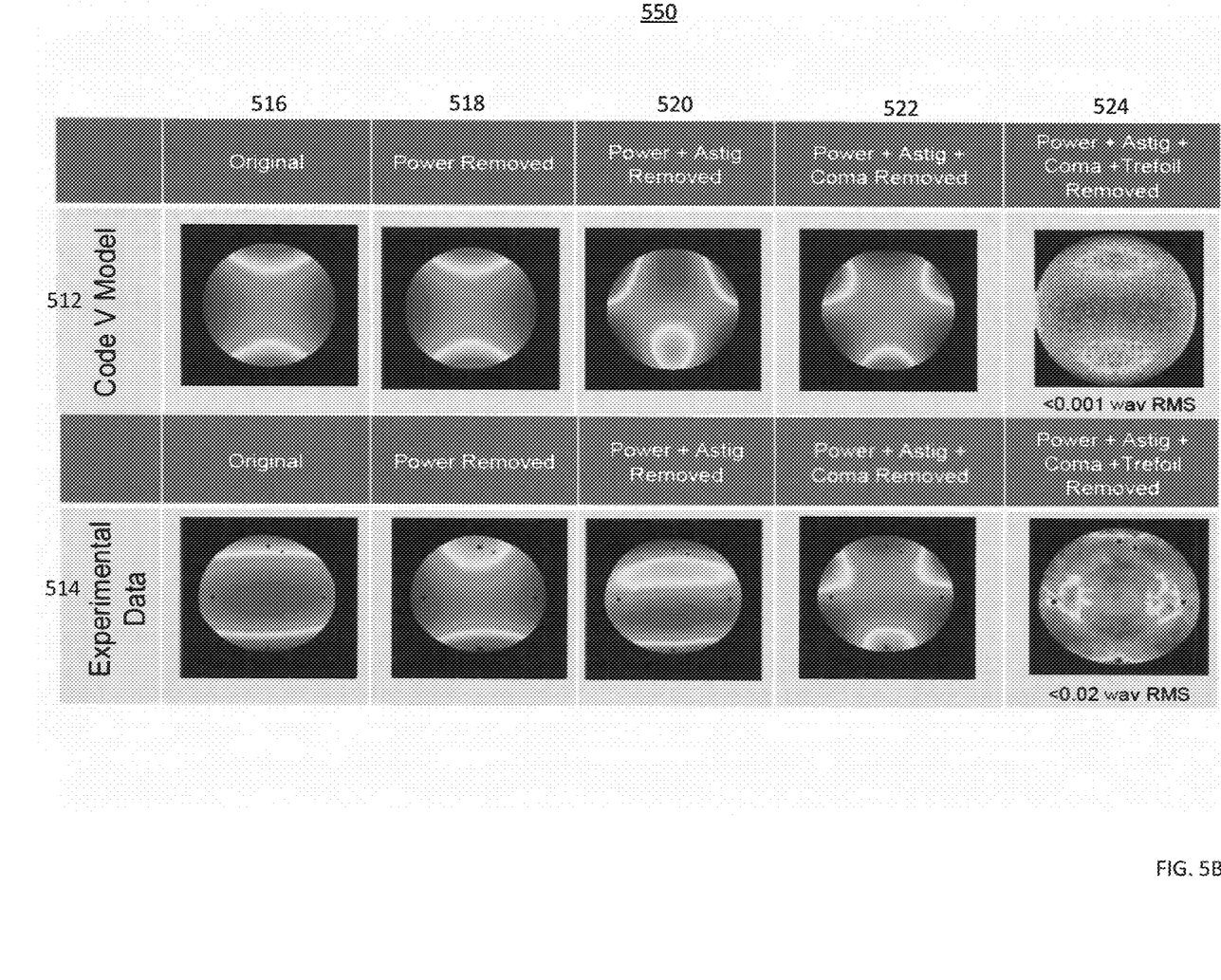
FIG. 5B is a visual rendering of removing characteristics caused by the test plate, according to an embodiment of the present invention.

FIGS. 5A and 5B have been provided to help further explain an exemplary QTIP process. FIG. 5B, for example, illustrates an exemplary QTIP test flow. Image 502 shows a circular test plate testing an optical surface. The test plate is shown to produce periodic fringes that are visible to the camera. The test plate may also include fiducials (e.g. circular markers) that are visible to the camera. Fiducials are used as a tool to analyze the optical alignment between the camera and the test plate (i.e. determine angle of incidence). This information may be helpful when performing QTIP analysis. An example is shown as fiducial 504 which has a slightly elliptical shape due to the incidence angle between the camera and test plate.

In one example, during the QTIP test flow, computer 108 may compute a Fast Fourier Transform (FFT) of the fringes captured in image 502. This FFT is shown as image 506 and provides frequency domain information pertaining to the fringes in image 502. For example, in image 506, a direct current (DC) value can be extracted from image artifact 506A, while fringe periodic values can be extracted from image artifacts 506B and 506C. Once these values are extracted, an inverse FFT, and a phase unwrapping may be performed to produce image 507 representing the optical surface error. This is shown in more detail in image 508, where the optical surface error is due to a periodic undulation of the optical surface under test. From image 508, the amplitude, period and direction of this surface undulation may be determined. A graphical representation of this periodic optical surface error is shown in image 510, where 510A represents the ideal error with increasing spatial separation, and where 510B represents the actual error due to periodic undulations in the optical surface under test.

The optical test plate may not match the optical surface under test. In order to accurately assess the optical surface under test, the effects of the test plate may be removed or minimized. An example of this process is illustrated in FIG. 5B which shows a comparison between theoretical (row 512) and actual (row 514) results. The theoretical results in row 512 show the original image (column 516) of the optical surface due to the characteristics of the test plate. The remaining columns show characteristics of the test plate being removed from the image. Column 518 shows the radius of curvature (e.g. power) of the test plate removed. Column 520 shows the power and the astigmatism of the test plate removed. Column 522 shows the power, astigmatism and the coma (imperfections) of the test plate removed. As can be seen in column 524, the actual results in row 514 are similar to the theoretical results in row 512. Essentially, the effects of the test plate have been removed from the image revealing the true wavefront of the optical surface under test.

Figure 6:
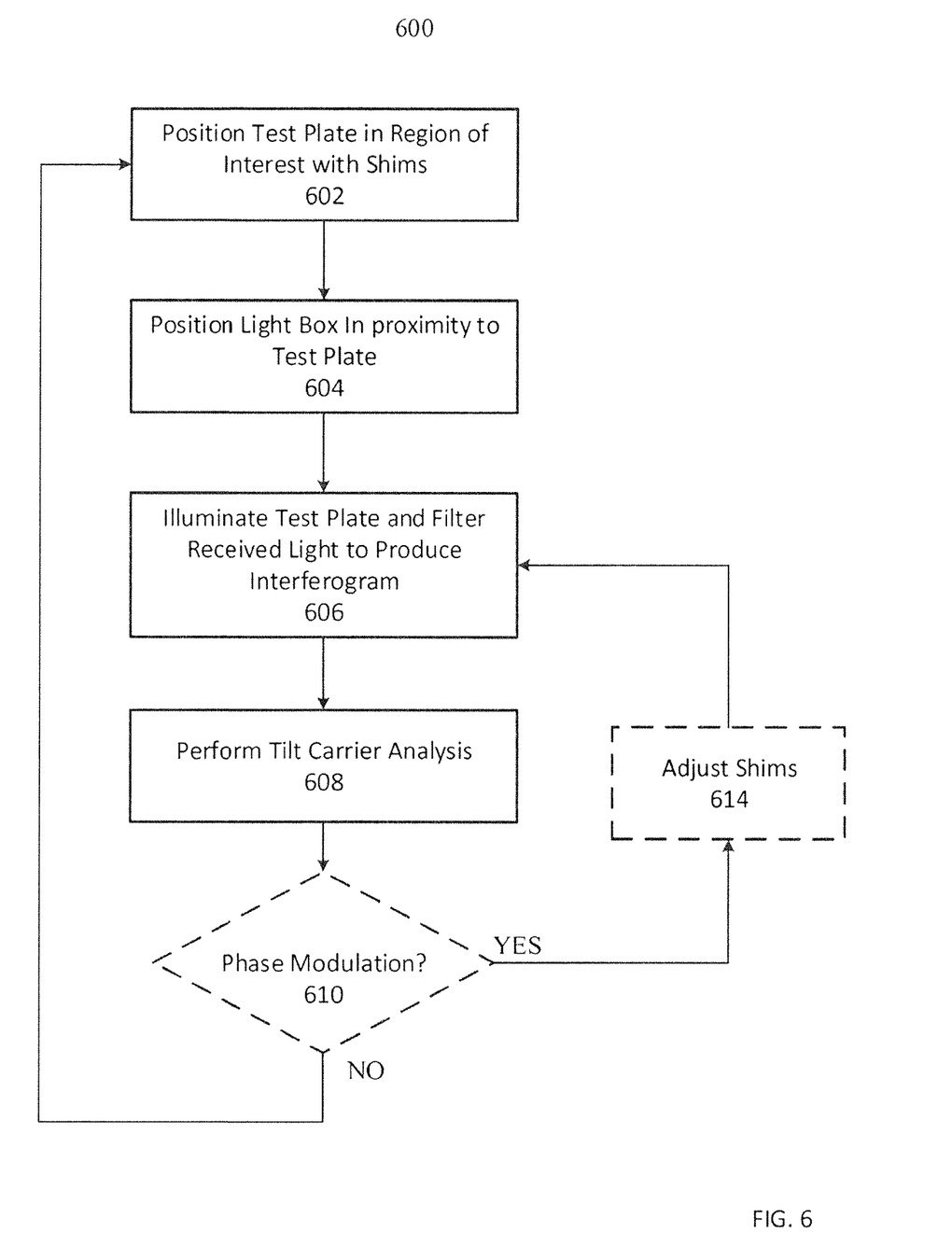
FIG. 6 is another flowchart showing more details of an exemplary process flow according to an embodiment of the present invention.

Exemplary details of QTIP steps 410 and 412 are further described in the flowchart of FIG. 6. In step 602, test plate 104 is positioned above the selected area of optical surface 102. In step 604, light box 106 is positioned in proximity to test plate 104. In step 606, computer 108 causes non-coherent light source 112 to illuminate test plate 104 to produce an interferogram. The image captured by detector 110 is then analyzed by computer 108 using tilt carrier analysis in step 608. In optional step 610, computer 108 determines if phase modulation is desired. If phase modulation is desired, then in step 514, the shims are adjusted to produce a different tilt of test plate 104, and steps 606-610 are repeated for the same area of optical surface 102 (e.g. test plate 104 is not moved). This produces a slightly different interferogram for the same selected section of optical surface 102. Two or more interferograms may then be quantitatively analyzed to determine the physical characteristics of surface 102 If phase modulation is not desired, then test plate 104 is positioned over another section of optical surface 102, and the whole process is repeated. This process can be repeated until multiple sections (areas) of optical surface 102 are analyzed (e.g. random or predetermined areas on optical surface 102 are analyzed). Once a sufficient sample of areas has been analyzed using test plate 104 and the tilt carrier technique, the system (e.g. computer) determines if surface 102 passes or fails. If surface 102 passes then no further polishing is needed. If, however, surface 102 fails, further polishing is performed.

As already shown, the image in column 524, row 514 of FIG. 5B illustrates the surface area error in the optical surface. This image shows error due to large undulating peaks and valleys which indicate that the optical surface fails the test in step 414 and should be polished.

Figure 7:
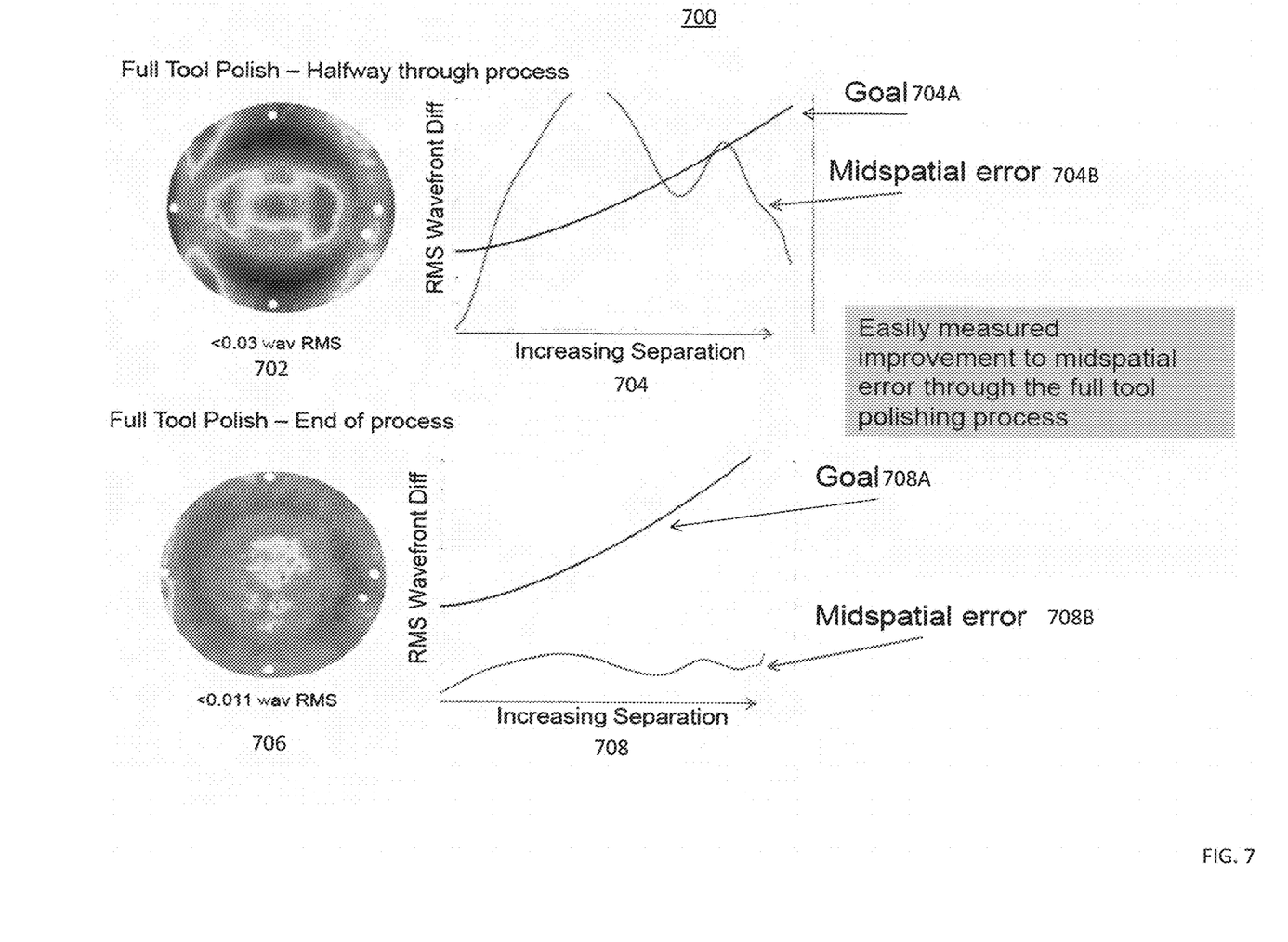
FIG. 7 is a visual rendering of polishing results of the optical surface, according to an embodiment of the present invention.

An example of optical surface polishing results are found in FIG. 7. As polishing is performed, the undulations are gradually rubbed out of the optical surface. An example is shown in image 702 which illustrates the surface area error in the optical surface halfway through polishing. As shown in data plot 704, the actual spatial error 704B still has significant peaks and valleys as opposed to the goal 704A which is smooth. However, after full polishing of the optical surface is performed, the optical surface is tested again and shows in image 706 that most of the aberrations in the optical surface have been removed by the polishing tool. Data plot 708 confirms this, as the actual spatial error 708B has minimal peaks and valleys and is closer to the goal 708A.

In general, testing is performed before and after polishing of the optical surface. Polishing may include a slurry that is rubbed by the tool across surface 102. After polishing is performed, optical surface 102 may need to be thoroughly cleaned prior to subsequent QTIP testing. This ensures that the slurry does not affect the analysis.

Although the QTIP system is useful for determining if the optical surface 102 passes or fails (e.g. binary decision), it may also be used for providing additional information, such as suggesting polishing techniques. For example, an interferogram contains information describing the physical characteristics of optical surface 102. This allows computer 108 (e.g. using the tilt carrier analysis) to determine physical characteristics across the entire area of the section under test. For example, QTIP testing can provide details of the period, position and amplitude of the error on surface 102. This information could be used to adjust stroke length of a polishing tool to optimize the removal rate of the frequency error in optical surface 102. For example, if it is determined that the period of the error on surface 102 is 20 mm, then the stroke length of the polishing tool may be set to a value (e.g. 50 mm) that would be efficient in removing the error. This polishing technique may be performed across the entire surface 102 (same technique all over), or may be performed in specific areas (different techniques for different areas on surface 102). In addition to alerting a technician that additional polishing is required, computer 108 can also display information relating to suggested polishing techniques (e.g. polishing pressure, angle, material, rotation direction/rate, etc.) that may be beneficial for correcting the detected aberrations of optical surface 102. In another example, a 2D map may show the varying heights of the optical lens so that the technician can visualize the aberrations in surface 102. These polishing suggestions and/or the 2D map can be displayed on the monitor of computer 108, or may be automatically implemented in a system in which polishing parameters are also controlled by the QTIP system computer, or a computer in communication therewith.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A system for testing an optical surface, the system comprising:
    a spatially non-coherent light source that emits spatially non-coherent light;
    a test plate positioned between the spatially non-coherent light source and the optical surface, the test plate separated from the optical surface by a spatially varying gap that produce s a wedge;
    a detector;
    wherein:
    a first portion of the spatially non-coherent light travels along a first optical path that extends from the spatially non-coherent light source to the test plate and then to the detector, and
    a second portion of the spatially non-coherent light travels along a second optical path that extends from the spatially non-coherent light source to the optical surface and then to the detector,
    wherein the first optical path has a first non-normal angle of incidence with respect to the test plate, and the second optical path having a second non-normal angle of incidence with respect to the optical surface, such that the emitted spatially non-coherent light impinges on the test plate at a non-normal angle of incidence and produces a spatially non-coherent light interference signal from interference between the first portion of the spatially non-coherent light reflected from the test plate and the second portion of the spatially non-coherent light reflected from the optical surface, the second non-normal angle of incidence being different than the first non-normal angle of incidence such that the first optical path and second optical path are spatially separated from each other and/or non-parallel in regions where the first optical path and the second optical path are overlapping;
    wherein the detector is configured to capture an interferogram of the spatially non-coherent light interference signal, the interferogram comprising a plurality of fringes;
    a processor connected to the detector and programmed with machine-readable instructions that when executed by the processor cause the processor to perform quantitative analysis on the interferogram captured by the detector to characterize aberrations in the optical surface using tilt carrier analysis of the fringes of the interferogram;
    a light box positioned relative to the test plate and containing both the non-coherent light source and the detector; and
    a means for suspending and positioning the light box above the test plate and a facing surface of the optical surface to be tested, the means for suspending and positioning comprising a motorized positioner connected to a controller configured to manually or automatically manipulate the motorized positioner to move the light box into a plurality of positions relative to the facing surface of the optical surface.

2. The system of claim 1,
wherein the test plate comprises a spherical surface.

3. The system of claim 1, further comprising means for suspending and positioning the light box above the test plate and a facing surface of the optical surface to be tested, the means for suspending and positioning comprising a motorized positioner connected to a controller configured to manually or automatically manipulate the motorized positioner to move the light box into a plurality of positions relative to the facing surface of the optical surface.

4. The system of claim 3,
wherein the means for suspending comprises a track or gantry system and the processor is programmed with machine-readable instructions that when executed by the processor cause the processor to control the motorized positioner controller to move the light box along the track or with the gantry system to position the light box into the plurality of positions.

5. The system of claim 3,
wherein the means for suspending comprises a crane boom and the processor is programmed with machine-readable instructions that when executed by the processor cause the processor to control the motorized positioner controller to move the crane boom to position the light box into the plurality of positions.

6. The system of claim 1, further including:
an optical filter positioned relative to the detector for selecting a predetermined wavelength of the spatially non-coherent light.

7. The system of claim 1,
further comprising a first independent fixture to which the spatially non-coherent light source is mounted and a second independent fixture to which the detector is mounted.

8. The system of claim 1,
wherein the spatially non-coherent light source emits light in a spectrum comprising visible or infrared wavelengths.

9. The system of claim 1, further comprising:
a light diffuser positioned between the spatially non-coherent light source and the optical surface.

10. The system of claim 1, wherein the test plate has a best fit sphere to optic prescription.

11. The system of claim 10, wherein the optical surface has an aspheric prescription and the test plate has a best fit sphere to the aspheric prescription of the optical surface.

12. The system of claim 11, wherein the optical surface has a convex aspheric prescription and the test plate has a best fit sphere to the convex aspheric prescription of the optical surface.

13. The system of claim 1, further comprising a bandpass filter in the first optical path between the spatially non-coherent light source and the detector.

14. The system of claim 1, wherein the first optical path is devoid of optics between the spatially non-coherent light source and the test plate other than an optional diffuser, an optional bandpass filter, or a combination thereof.

15. The system of claim 3, wherein the means for suspending comprises a wire suspension system and the processor is programmed with machine-readable instructions that when executed by the processor cause the processor to control the motorized positioner controller to manipulate the light box into the plurality of positions using the wire suspension system.

16. A system for testing an optical surface, the system comprising:
a spatially non-coherent light source that emits light in a first optical path;
a test plate positioned between the spatially non-coherent light source and the optical surface, the test plate separated from the optical surface by piezoelectric actuators to form spatially varying gap that produces a wedge;
a detector;
wherein:
a first portion of the spatially non-coherent light travels along a first optical path that extends from the spatially non-coherent light source to the test plate and then to the detector, and
a second portion of the spatially non-coherent light travels along a second optical path that extends from the spatially non-coherent light source to the optical surface and then to the detector,
wherein the first optical path has a first non-normal angle of incidence with respect to the test plate, and the second optical path having a second non-normal angle of incidence with respect to the optical surface, such that the emitted spatially non-coherent light impinges on the test plate at a non-normal angle of incidence and produces a spatially non-coherent light interference signal from interference between the first portion of the spatially non-coherent light reflected from the test plate and the second portion of the spatially non-coherent light reflected from the optical surface, the second non-normal angle of incidence being different than the first non-normal angle of incidence such that the first optical path and second optical path are spatially separated from each other and/or non-parallel in regions where the first optical path and the second optical path are overlapping;
wherein the detector is configured to capture an interferogram of the spatially non-coherent light interference signal, the interferogram comprising a plurality of fringes; and
a processor connected to the detector and the piezoelectric actuators, the processor programmed with machine-readable instructions that when executed by the processor cause the processor to:
energize the piezoelectric actuators to spatially vary the gap between the test plate and the optical surface; and
perform quantitative analysis on the interferogram captured by the detector to characterize aberrations in the optical surface using tilt carrier analysis on the fringes of the interferogram.

17. A system for testing an optical surface, the system comprising:
a spatially non-coherent light source that emits spatially non-coherent light;
a test plate positioned between the spatially non-coherent light source and the optical surface, the test plate separated from the optical surface by a spatially varying gap that produces a wedge;
a detector;
wherein:
a first portion of the spatially non-coherent light travels along a first optical path that extends from the spatially non-coherent light source to the test plate and then to the detector, and a second portion of the spatially non-coherent light travels along a second optical path that extends from the spatially non-coherent light source to the optical surface and then to the detector;

wherein the first optical path has a first non-normal angle of incidence with respect to the test plate, and the second optical path has a second non-normal angle of incidence with respect to the optical surface, such that the emitted spatially non-coherent light impinges on the test plate at a non-normal angle of incidence and produces a spatially non-coherent light interference signal from interference between the first portion of the spatially non-coherent light reflected from the test plate and the second portion of the spatially non-coherent light reflected from the optical surface, the second non-normal angle of incidence being different than the first non-normal angle of incidence such that the first optical path and second optical path are spatially separated from each other and/or non-parallel in regions where the first optical path and the second optical path are overlapping;

wherein the detector is configured to capture an interferogram of the spatially non-coherent light interference signal, the interferogram comprising a plurality of fringes;

a processor connected to the detector and programmed with machine-readable instructions that when executed by the processor cause the processor to perform quantitative analysis on the interferogram captured by the detector to characterize aberrations in the optical surface using tilt carrier analysis of the fringes of the interferogram; and a positioner connected to the processor and comprising means for positioning and moving the spatially non-coherent light source and detector relative to the optical surface to be tested, the positioner configured to provide a signal to the processor indicative of coordinates of the spatially non-coherent light source and detector in a first position relative to a reference point and to receive instructions from the processor for moving the spatially non-coherent light source and the detector to a second position relative to the reference point;

wherein the processor is further programmed with machine-readable instructions for controlling the positioner to move the spatially non-coherent light source and detector from the first position to the second position.

18. The system of claim 17, wherein the machine-readable instructions for controlling the positioner to move the spatially non-coherent light source and detector include instructions for controlling the positioner based on an instruction received from a technician, or instructions for controlling the positioner based on a predetermined testing path for the optical surface.

19. A method for testing an optical surface having a spatially non-coherent light source, a test plate, a detector, and a processor connected to the detector, the method comprising the steps of:

positioning the test plate in a first position between the spatially non-coherent light source and the optical surface such that there is a spatially varying gap that produces a wedge between the optical surface and the test plate;

emitting spatially non-coherent light from the spatially non-coherent light source in a first optical path, wherein:

a first portion of the spatially non-coherent light travels along a first optical path that extends from the spatially non-coherent light source to the test plate and then to the detector, and a second portion of the spatially non-coherent light travels along a second optical path that extends from the spatially non-coherent light source to the optical surface and then to the detector;

wherein the first optical path has a first non-normal angle of incidence with respect to the test plate, and the second optical path having a second non-normal angle of incidence with respect to the optical surface, such that the emitted spatially non-coherent light impinges on the test plate at a non-normal angle of incidence and produces a spatially non-coherent light interference signal from interference between the first portion of the spatially non-coherent light reflected from the test plate and the second portion of the spatially non-coherent light reflected from the optical surface, the second non-normal angle of incidence being different than the first non-normal angle of incidence such that the first optical path and second optical path are spatially separated from each other and/or non-parallel in regions where the first optical path and the second optical path are overlapping;

capturing, with the detector, an interferogram of the spatially non-coherent light interference signal, the interferogram comprising fringes; and performing, by the processor, quantitative analysis on the fringes of the interferogram using tilt carrier analysis to characterize aberrations in the optical surface;

wherein the first optical path is devoid of optics between the spatially non-coherent light source and the test plate other than an optional diffuser, an optional bandpass filter, or a combination thereof.

20. The method of claim 19, A method for testing an optical surface having a spatially non-coherent light source, a test plate, a detector, and a processor connected to the detector, the method comprising the steps of:

positioning the test plate in a first position between the spatially non-coherent light source and the optical surface such that there is a spatially varying gap that produces a wedge between the optical surface and the test plate;

emitting spatially non-coherent light from the spatially non-coherent light source in a first optical path;

wherein:

a first portion of the spatially non-coherent light travels along a first optical path that extends from the spatially non-coherent light source to the test plate and then to the detector, and a second portion of the spatially non-coherent light travels along a second optical path that extends from the spatially non-coherent light source to the optical surface and then to the detector;

wherein the first optical path has a first non-normal angle of incidence with respect to the test plate, and the second optical path having a second non-normal angle of incidence with respect to the optical surface, such that the emitted spatially non-coherent light impinges on the test plate at a non-normal angle of incidence and produces a spatially non-coherent light interference signal from interference between the first portion of the spatially non-coherent light reflected from the test plate and the second portion of the spatially non-coherent light reflected from the optical surface, the second non-normal angle of incidence being different than the first non-normal angle of incidence such that the first optical path and second optical path are spatially separated from each other and/or non-parallel in regions where the first optical path and the second optical path are overlapping;

capturing, with the detector, an interferogram of the spatially non-coherent light interference signal, the interferogram comprising fringes; and performing, by the processor, quantitative analysis on the fringes of the interferogram using tilt carrier analysis to characterize aberrations in the optical surface;

wherein the processor is connected to a motorized positioner configured to indicate a first position of the spatially non-coherent light source and detector relative to the optical surface to be tested and to move the spatially non-coherent light source and the detector relative to the optical surface to be tested, further comprising the steps of:

determining, by the processor, the first position of the spatially non-coherent light source and the detector relative to the optical surface; and controlling, by the processor, the motorized positioner to move the spatially non-coherent light source and the detector from the first position to a second position relative to the optical surface to be tested.

21. The method of claim 20, further comprising the steps of:

controlling, by the processor, the motorized positioner to move the spatially non-coherent light source and the detector across the optical surface, and performing, by the processor, the quantitative analysis on different areas of the surface to determine aberrations at the different areas.

22. The method of claim 20, further comprising the steps of:

receiving, by the processor, instructions from a technician to move the spatially non-coherent light source and the detector to a predetermined position; and controlling, by the processor, the motorized positioner to move the spatially non-coherent light source and the detector to the predetermined position.

23. The method of claim 20, further comprising the steps of:

emitting, by the spatially non-coherent light source, infrared light; and filtering, prior to image capture, the light reflected from the test plate and the light reflected from the optical surface, to an infrared wavelength.

24. The method of claim 19, wherein the test plate has a spherical configuration or a best fit sphere to optic prescription.

25. A system for testing an optical surface, the system comprising:

a light box enclosing a spatially non-coherent light source and a detector, the non-coherent light source configured to emit spatially non-coherent light in first optical path and a spectrum comprising visible or infrared wavelengths;

a test plate, having a spherical surface or a best fit sphere to optic prescription, positioned between the spatially non-coherent light source and the optical surface, the test plate separated from the optical surface by a spatially varying gap that produces a wedge, wherein:

a first portion of the spatially non-coherent light travels along a first optical path that extends from the spatially non-coherent light source to the test plate and then to the detector, and a second portion of the spatially non-coherent light travels along a second optical path that extends from the spatially non-coherent light source to the optical surface and then to the detector, wherein the first optical path has a first non-normal angle of incidence with respect to the test plate, and the second optical path having a second non-normal angle of incidence with respect to the optical surface, such that the emitted spatially non-coherent light impinges on the test plate at a non-normal angle of incidence and produces a spatially non-coherent light interference signal from interference between the first portion of the spatially non-coherent light reflected from the test plate and the second portion of the spatially non-coherent light reflected from the optical surface, the second non-normal angle of incidence being different than the first non-normal angle of incidence such that the first optical path and second optical path are spatially separated from each other and/or non-parallel in regions where the first optical path and the second optical path are overlapping;

wherein the detector is configured to capture, an interferogram of the spatially non-coherent light interference signal, the interferogram comprising a plurality of fringes;

a light diffuser positioned in the light box between the spatially non-coherent light source and the optical surface;

an optical filter positioned relative to the detector for selecting a predetermined wavelength of the spatially non-coherent light;

a processor connected to the spatially non-coherent light source and the detector, the processor programmed with instructions that when executed by the processor cause the processor to:

control the detector to capture the interferogram, and perform quantitative analysis on the interferogram to characterize aberrations in the optical surface using tilt carrier analysis of the fringes of the interferogram; and means for suspending and positioning the light box above the test plate and a facing surface of the optical surface to be tested, the means for suspending and positioning comprising a motorized positioner connected to a controller configured to manually or automatically manipulate the motorized positioner to move the light box into a plurality of positions relative to the facing surface of the optical surface.

26. A system for testing an optical surface, the system comprising:

a light box enclosing a spatially non-coherent light source and a detector, the non-coherent light source configured to emit spatially non-coherent light in first optical path and a spectrum comprising visible or infrared wavelengths;

a test plate, having a spherical surface or a best fit sphere to optic prescription, positioned between the spatially non-coherent light source and the optical surface, the test plate separated from the optical surface by a spatially varying gap that produces a wedge, wherein:
a first portion of the spatially non-coherent light travels along a first optical path that extends from the spatially non-coherent light source to the test plate and then to the detector, and
a second portion of the spatially non-coherent light travels along a second optical path that extends from the spatially non-coherent light source to the optical surface and then to the detector,
wherein the first optical path has a first non-normal angle of incidence with respect to the test plate, and the second optical path having a second non-normal angle of incidence with respect to the optical surface, such that the emitted spatially non-coherent light impinges on the test plate at a non-normal angle of incidence and produces a spatially non-coherent light interference signal from interference between the first portion of the spatially non-coherent light reflected from the test plate and the second portion of the spatially non-coherent light reflected from the optical surface, the second non-normal angle of incidence being different than the first non-normal angle of incidence such that the first optical path and second optical path are spatially separated from each other and/or non-parallel in regions where the first optical path and the second optical path are overlapping;
wherein the detector is configured to capture an interferogram of the spatially non-coherent light interference signal, the interferogram comprising a plurality of fringes;
a light diffuser positioned in the light box between the spatially non-coherent light source and the optical surface;
a processor connected to the spatially non-coherent light source and the detector, the processor programmed with instructions that when executed by the processor cause the processor to:
control the detector to capture the interferogram, and
perform quantitative analysis on the interferogram to characterize aberrations in the optical surface using tilt carrier analysis of the fringes of the interferogram; and
wherein the first optical path is devoid of optics between the spatially non-coherent light source and the test plate other than an optional diffuser, an optional bandpass filter, or a combination thereof.

\* \* \* \* \*

UNITED STATES PATENT AND TRADEMARK OFFICE
CERTIFICATE OF CORRECTION

PATENT NO. : 11,346,747 B2
APPLICATION NO. : 15/795802
DATED : May 31, 2022
INVENTOR(S) : Cormic Merle et al.

It is certified that error appears in the above-identified patent and that said Letters Patent is hereby corrected as shown below:

In the Claims

Column 12, Line 36, Claim 20, delete "The method of claim 19,"

Signed and Sealed this
Nineteenth Day of July, 2022

Katherine Kelly Vidal
*Director of the United States Patent and Trademark Office*